United States Patent
Imanishi et al.

(10) Patent No.: US 6,466,538 B1
(45) Date of Patent: Oct. 15, 2002

(54) OPTICAL RECORDING MEDIUM HAVING DISCONNECTED LAND AND GROOVE FORMING CONTROL PORTION

(75) Inventors: Shingo Imanishi, Kanagawa; Toshiyuki Kashiwagi, Tokyo; Masanobu Yamamoto, Kanagawa, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/649,688

(22) Filed: Aug. 28, 2000

Related U.S. Application Data (62) Division of application No. 09/143,054, filed on Aug. 28, 1998, now Pat. No. 6,136,402.

(30) Foreign Application Priority Data

Aug. 29, 1997 (JP) .............................................. 9-234978

(51) Int. Cl.[7] ................................................ G11B 7/24
(52) U.S. Cl. ..................... 369/275.4; 369/277; 428/64.4
(58) Field of Search ........................... 369/275.4, 275.1, 369/275.2, 275.3, 277, 278, 279; 430/320, 321; 428/64.4, 64.1

(56) References Cited

U.S. PATENT DOCUMENTS

| | | | | |
|---|---|---|---|---|
| 4,879,707 A | * | 11/1989 | Getreuer et al. | 369/44.28 |
| 5,084,860 A | * | 1/1992 | Maeda et al. | 369/275.3 |
| 5,444,682 A | * | 8/1995 | Yamada et al. | 369/32 |
| 5,477,524 A | * | 12/1995 | Deguchi et al. | 369/275.1 |
| 5,940,364 A | * | 8/1999 | Ogata et al. | 369/275.4 |

* cited by examiner

*Primary Examiner*—Tan Dinh
(74) *Attorney, Agent, or Firm*—Sonnenschein, Nath & Rosenthal (57) ABSTRACT

An optical recording medium, in which a signal is recorded in both of a groove and a land, has a disconnected portion of a predetermined interval in the groove and the land so that a control signal is detected by this disconnected portion.

2 Claims, 9 Drawing Sheets

OPTICAL RECORDING MEDIUM HAVING DISCONNECTED LAND AND GROOVE FORMING CONTROL PORTION

This application is a divisional of application Ser. No 09/143,054 filed on Aug. 28, 1998 now U.S. Pat No. 6,136,402.

BACKGROUND OF THE INVENTION

1. Field of the Invention

The present invention relates to an optical recording medium for recording a signal both on a groove and land, and a production method of the same.

2. Description of the Prior Art

For a rewritable high-density optical recording medium, especially a magneto-optical recording medium, a format to realize a capacity as large as 5 to 7 GB on one side (a diameter of 12 cm, i.e., a so called CD size) has been suggested by providing a disc substrate having a thickness of only 0.6 mm, with a numerical aperture NA of 0.6 in an optical system, a single-plate configuration for enabling magnetic field modulation, a recording/reproduction laser wavelength of 630 to 60 nm, a track pitch of 0.6 $\mu$m, a recording density of 0.20 $\mu$m/bit.

In this case, the groove configuration is a land/groove recording method which is advantageous for a high density.

In the aforementioned land/groove recording method, both of the land and groove are formatted so as to be capable of recording and reproduction and the optical disc has two-spiral configuration of the land and groove.

The land/groove format is an advantageous format for reducing the track pitch. When a tracking signal is fetched with a push-pull signal, it is possible to obtain a signal from two tracks. Accordingly, it is possible to create an error signal up to a half of a conventional track pitch and its polarity is used to identify a land and a track.

Moreover, in reproduction from a magneto-optical recording medium, it is possible to carry out an optical mask based on a difference in the depth of the land and groove. By effectively selecting a depth, it is possible to reduce a cross talk from an adjacent track.

In the aforementioned land/groove recording method also, it is necessary to provide a control signal such as a clock signal for detecting a head of an information signal, and a format for a fine clock has been studied.

In this case, a clock mark is a head detecting signal and should not require a large area.

To cope with this, there has been suggested a technique to provide an address signal and a clock signal by wobbling a groove and to increase efficiency by sharing the clock signal with a data block.

However, this technique has a problem that a jitter is generated in a clock extraction if a recording spot is deviated from the track center.

SUMMARY OF THE INVENTION

It is therefore an object of the present invention to provide an optical recording medium capable of providing a control signal in a small area and detecting this control signal such as a clock signal causing little jitter, and a production method of the same.

In order to achieve the aforementioned object, the optical recording medium according to the present invention has a groove and land so that a signal is recorded in both of the groove and the land, wherein each of the groove and the land has a disconnected portion of a predetermined interval so that a control signal is detected from the disconnected portions.

It is preferable that the interval be greater than a diameter of a laser spot for recording and reproducing the optical recording medium.

Moreover, the optical recording medium production method according to the present invention includes steps of: optically cutting a groove by applying a laser beam to a photoresist layer formed on a glass original disc; wobbling the laser beam so as to form a disconnected portion of the groove and a disconnected portion of a land; and producing an optical recording medium original disc by the optical cutting.

The laser beam is two in number, which are wobbled in opposite directions to each other so as to form the disconnected portions.

BRIEF DESCRIPTION OF THE DRAWINGS

FIGS. 10 (A,B,C,D) shows a change of a synchronization signal by an AND signal based on a gap length.

DETAILED DESCRIPTION OF PREFERRED EMBODIMENTS

Description will now be directed to an optical recording medium and its production method according to the present invention with reference to the attached drawings.

Figure 1:
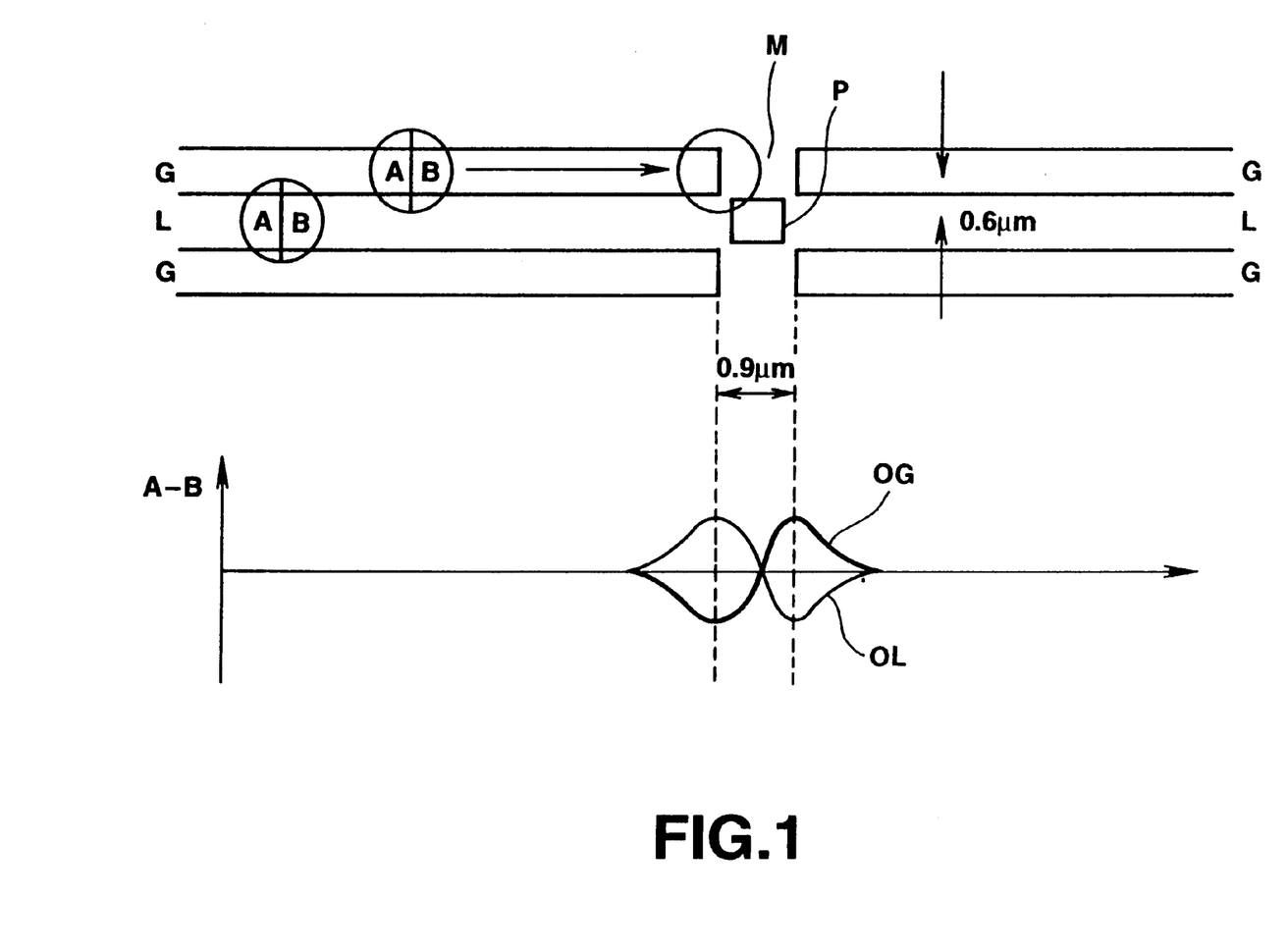
FIG. 1 schematically shows an example of a control signal detection pattern in an optical recording medium according to the present invention and a detection signal obtained from this.

FIG. 1 shows a groove G and a land L formed in an optical recording medium of the land/groove recording method.

In an optical recording medium (optical disc) of the land/groove recording method, a groove G and a land L are alternately formed in a radial direction and they have an almost identical width. In this embodiment, the track pitch is 0.6 $\mu$m, and the groove width is 0.6 $\mu$m (resulting in the land width of 0.6 $\mu$m).

The aforementioned groove G is formed as coaxial circles or in a spiral shape and accordingly, the groove G and the land L constitute, for example, a double spiral configuration.

In the optical recording medium according to the present invention, the aforementioned groove G is disconnected by a mirror mark section M. The groove G is formed as an indentation on a substrate, whereas the mirror mark section M is not an indentation but a flat section. Thus, the groove G is disconnected by this flat section.

On the other hand, the land L is defined between two of the aforementioned grooves G and constitutes a flat plane continuous to the aforementioned mirror mark section M. The land L is disconnected by a pit P formed as an indentation.

In the optical recording medium having the aforementioned configuration, a laser beam was applied to the center of the groove G as a track center and a reflected beam was detected by a photo-detector divided into two sections in the running direction. As a result, a tan-P-P signal (A–B) as shown by a line OG in the figure was detected.

Similarly, a laser beam was applied to the center of the land L as a track center and a reflected light was detected by a photo-detector divided into two sections in the running direction. As a result, a tan-P-P signal (A–B) as indicated by a line OL in the figure was detected.

It should be noted that this tan-P-P signal was confirmed by a recording/reproduction optical system set to a laser wavelength $\lambda=635$ nm and NA=0.6.

Consequently, by utilizing these tan-P-P signal as a control signal, for example, it is possible to record a clock signal or the like. The clock signal detected is one having little jitter. Moreover, the aforementioned mirror mark section M and the pit P enable a pattern formation in an area reduced by half compared to a case of clock formation by S-shaped wobble.

For preparing the aforementioned optical recording medium, some technique is required for carrying out an optical cutting on an original disc.

The most simple method is to wobble the beam corresponding to the aforementioned disconnected portion when carrying out a one-beam cutting of a groove G using an optical system of a low NA.

In the land/groove recording method, it is necessary to set that a ratio of the land width to the groove width almost 1:1. For example, if the track pitch is 0.6 $\mu$m, the groove width should be 0.6 $\mu$m.

Consequently, for groove formation, the recording laser beam should have a spot diameter equal to or above 0.6 $\mu$m. This can be realized by lowering the incident NA to an exposure objective lens.

Furthermore, the fine clock section (pit P) is created by instantaneously wobbling the exposure laser beam in the radial direction.

Figure 2:
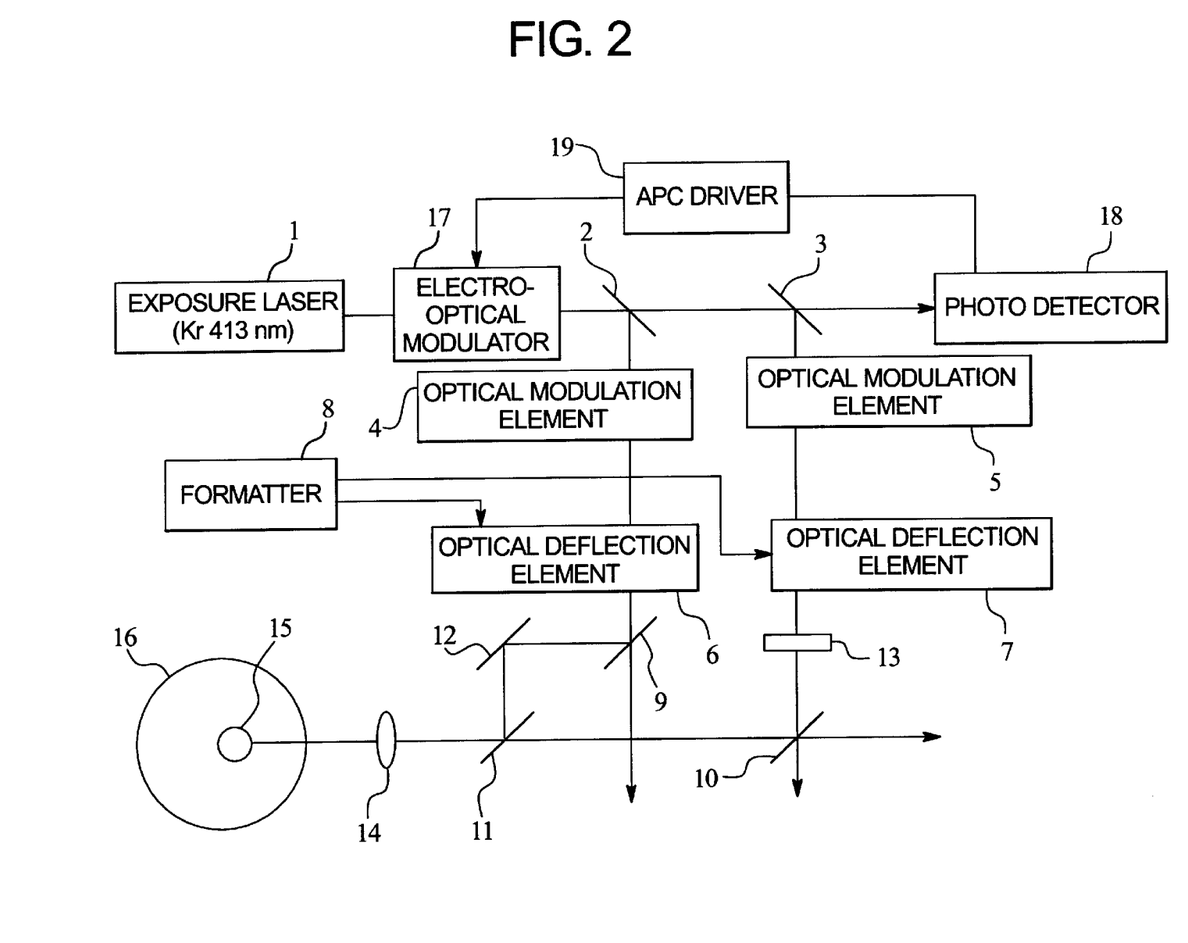
FIG. 2 schematically shows a configuration example of an optical cutting apparatus.

FIG. 2 shows an example of an exposure optical system (optical cutting apparatus) used for the aforementioned cutting.

This optical cutting apparatus includes an exposure laser (Kr 413 nm) 1, beam splitters 2 and 3 for dividing a laser beam from this exposure laser 1, into two beams, optical modulation elements 4 and 5 for modulating (ON/OFF) the beams, light deflection elements 6 and 7 for wobbling the beams, and a formatter for controlling these optical deflection elements 6 and 7. The beams wobbled by the optical deflection elements 6 and 7 are applied onto a photoresist original disc via an optical system consisting of a mirror 12, a ¼ wavelength plate 13, a diaphragm lens 14, and an objective lens 15.

Moreover, the laser beam from the exposure laser 1 is monitored via an electro-optical modulator (EOM) 17 by a photo detector 18. When the laser beam changes its intensity, the change is fed back by an APC driver 19 so that the intensity is maintained constant by the aforementioned EOM 17.

In a case of one-beam cutting, only one of the optical systems (the optical modulation element 4 and the optical deflection element 6, or the optical modulation element 5 and the optical deflection element 7) is used.

Figure 3:
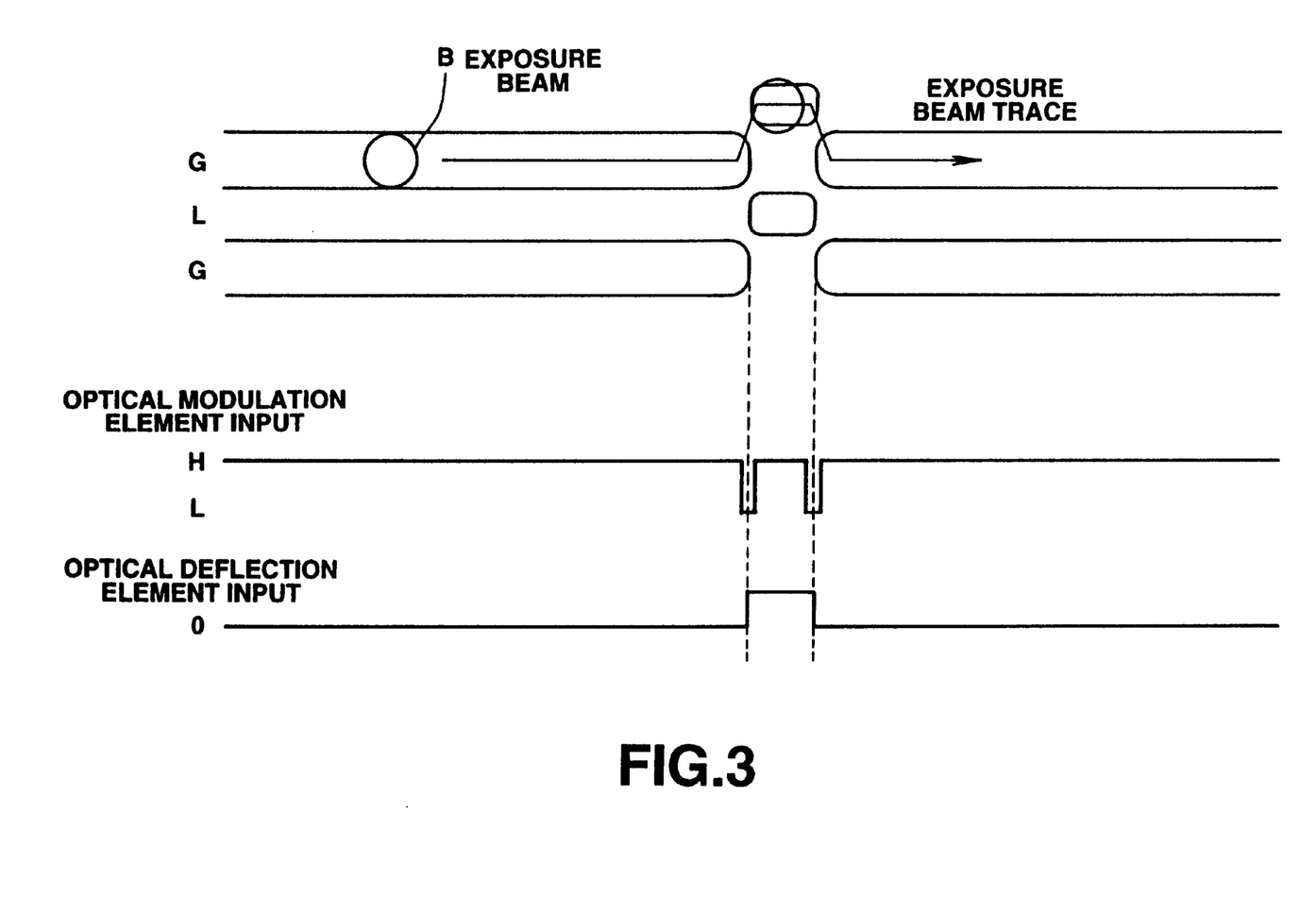
FIG. 3 schematically shows an example of a signal for controlling the optical cutting apparatus and an exposure beam trace by the signal.

FIG. 3 shows a control state of the optical modulation element and the optical deflection element in this case together with a trace of the exposure beam B.

The exposure beam B is scanned corresponding to the groove G, but the optical deflection element is turned on by the fine clock block, which instantaneously wobbles the exposure beam B in the radial direction for a predetermined period of time. The optical modulation element is kept on (H) but instantaneously turned off (L) when the exposure beam is moved in the radial direction.

This control enables to form the mirror mark portion M to disconnect the groove B and the pit P to disconnect the land L corresponding to the aforementioned wobble.

On the other hand, as a format for inserting an address and a clock in the land/groove recording method, there have been suggested a single-side wobble format and a format for recording with groove width modulation of the clock alone using a single carrier. As an exposure method for these formats, there has been suggested to overlying the two beams so as to form a groove of a wider width. If only one of the beams is wobbled, a single-side wobble is formed, and if both of the beams are wobbled into a reverse phase, the groove width modulation is carried out.

Figure 4:
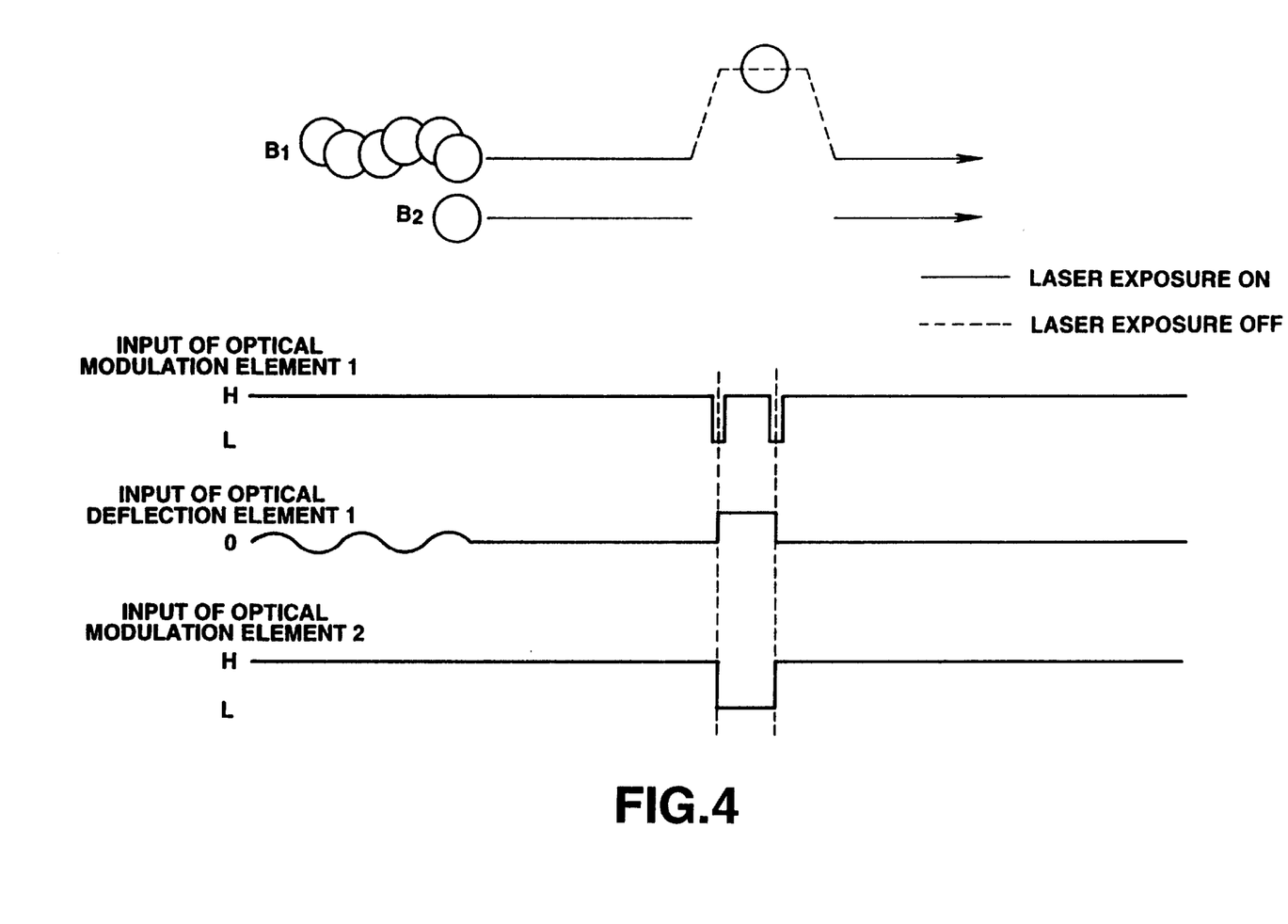
FIG. 4 schematically shows an exposure method in a single-side wobbling optical system.

Accordingly, these methods can be utilized to form the aforementioned fine clock. For example, as shown in FIG. 4, in a single-side wobble optical system, a pit can be formed on a land by increasing the amplitude of the wobble beam only at the fine clock. Simultaneously with this, a groove edge is also formed.

In the single-side wobble optical system, only one $B_1$ of the exposure beams, is wobbled while the other exposure beam $B_2$ is scanned in a straight line.

Here, an input of the optical system (assuming an optical modulation element 1 and an optical deflection element 1) for the exposure beam $B_1$ to be wobbled is controlled in the same way as the aforementioned one-beam cutting. On the other hand, in the optical system (assuming an optical modulation element 2 and an optical deflection element 2) for the exposure beam $B_2$ to be scanned in a straight line, the optical modulation element 2 is kept off only while the exposure beam $B_1$ is greatly wobbled.

Figure 5:
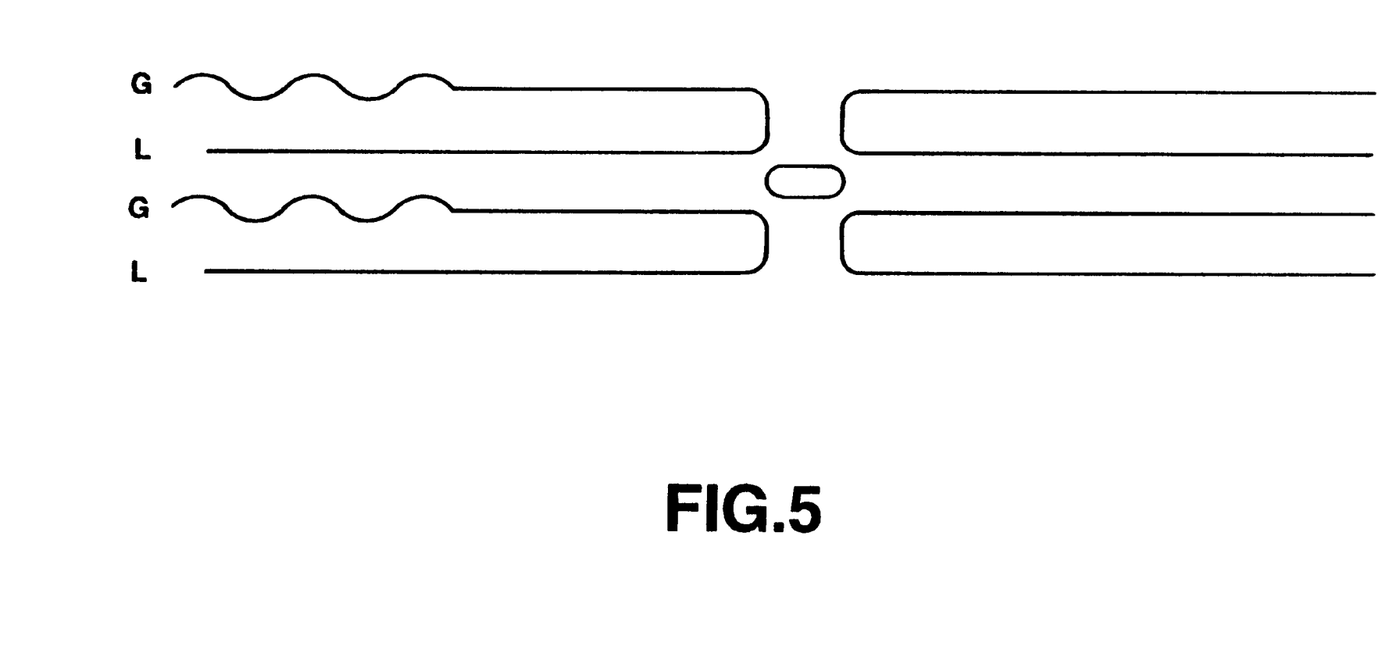
FIG. 5 schematically shows a pattern formed by the single-side wobble optical system.

As shown in FIG. 5, this enables to form a groove G having a single-side wobble pattern and a pit P for disconnecting the land.

However, in this case, the pit P formed on the land L has a smaller width than that of the groove G.

In order to detect the tan-P-P signal with a sufficient intensity, it is preferable that the groove area entirely cover one-side half of a recording/reproduction spot. Practically, however, it is possible to widen only up to the track pitch width, within which it is necessary to form a groove and pit with a possible greatest width.

Figure 6:
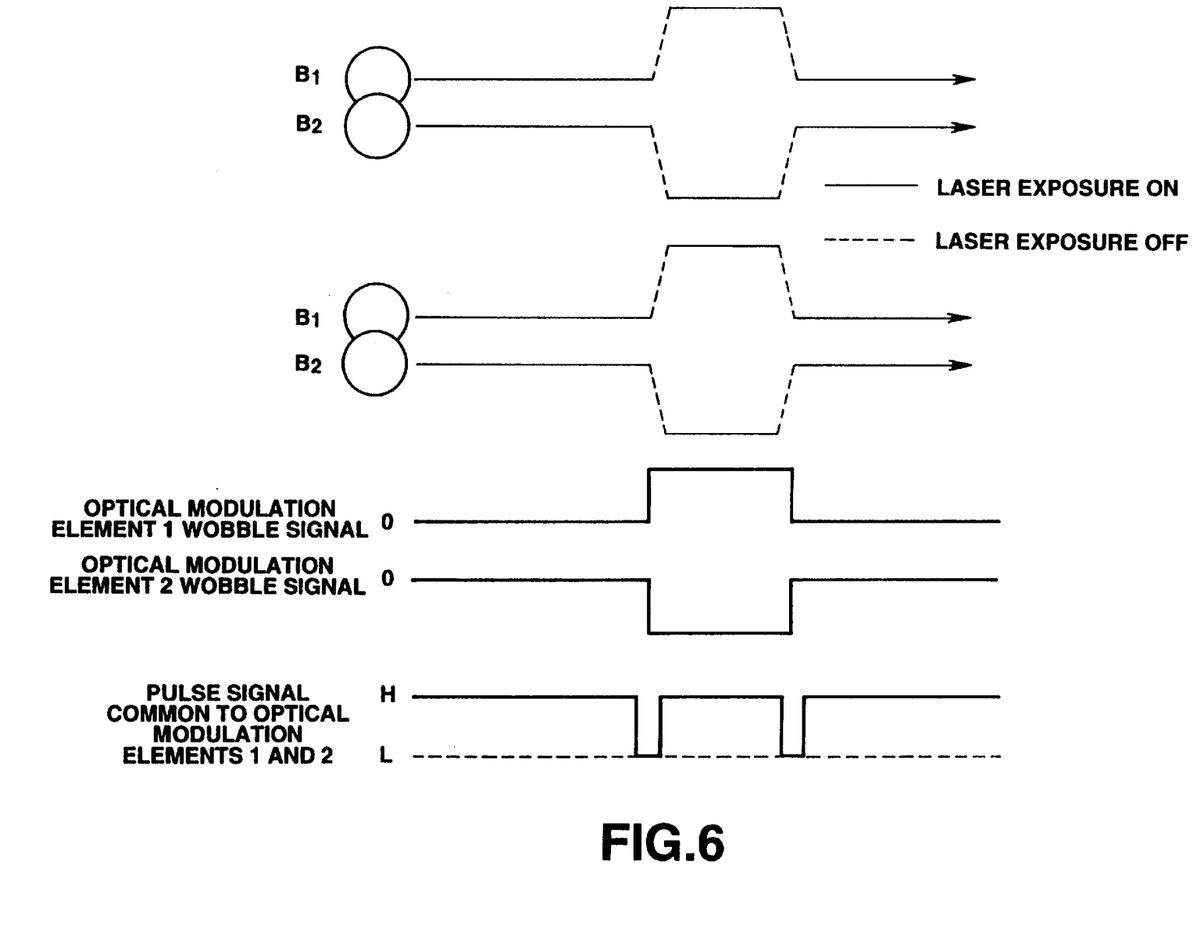
FIG. 6 schematically shows an exposure method by two-beam reverse-phase wobble.

A method to realize this is shown in FIG. 6. That is, the two beams are wobbled in opposite directions to each other, thus increasing the pit width.

As shown in FIG. 6, this can be achieved by simultaneously supplying wobble signals of opposite phases to the optical deflection elements for controlling the two beams.

Although not depicted, it is also possible to insert an address and a clock by way of one-side wobble, for example, in the extension of the groove.

On the other hand, when inserting some information by wobbling a groove, if the wobble frequency is too high, a distortion called cylindrical effect is generated depending on the characteristic of the optical deflection elements, thus distorting the groove configuration.

This is generated when an ultrasonic wave in the optical deflection elements intersects the light. Accordingly, when inserting an information by wobbling the groove, it is preferable to employ an optical system which eliminates this as the aforementioned cutting apparatus.

Figure 7:
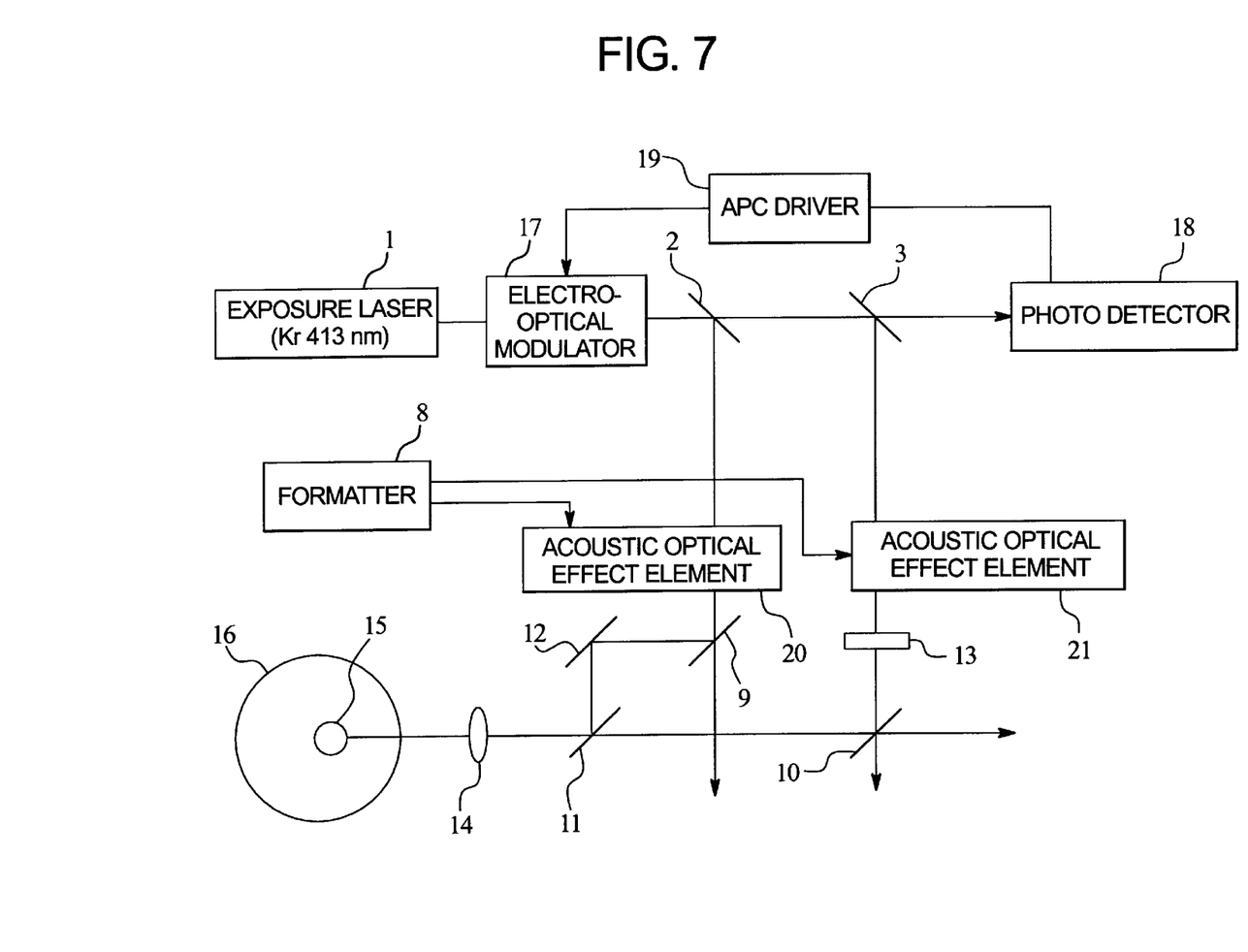
FIG. 7 schematically shows a configuration example of an optical cutting apparatus using an optical modulation element in combination with an optical deflecting element.
Figure 8:
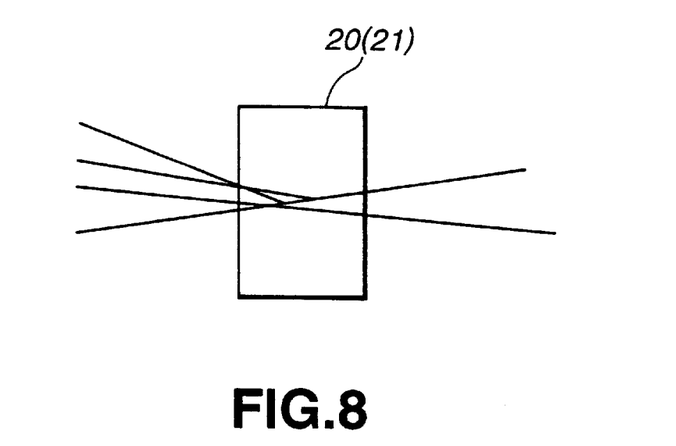
FIG. 8 schematically shows a state of an acoustic-optical effect element deflected from a focus plane.

More specifically, as shown in FIG. 7, it is preferable to employ acoustic-optical effect elements 20 and 21 serving as both of the optical modulation element and the optical deflection element, which are arranged as shown in FIG. 8, at a position deflected from a focal point plane of a converging lens. With this configuration, it is possible to modulate the exposure beam at a high speed and furthermore, in an optical system using a plurality of exposure beams, it is possible to modulate and deflect at a high speed the exposure beams independently from each other.

The explanation has been given, assuming detection with the tan-P-P signal. Alternatively, it is also possible to detect the fine clock signal by detecting a synchronization signal using an AND signal.

Figure 9:
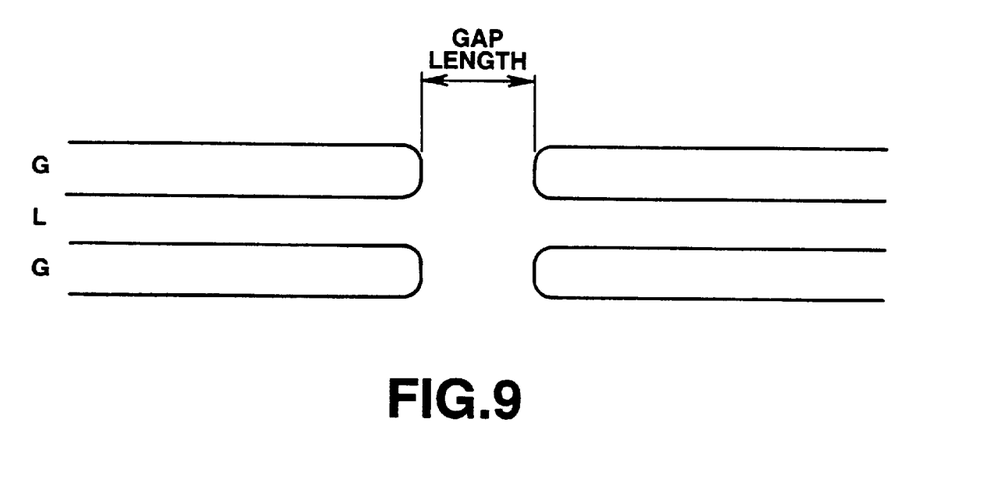
FIG. 9 schematically shows a pattern of a configuration where only the groove is disconnected.
Figure 10A:
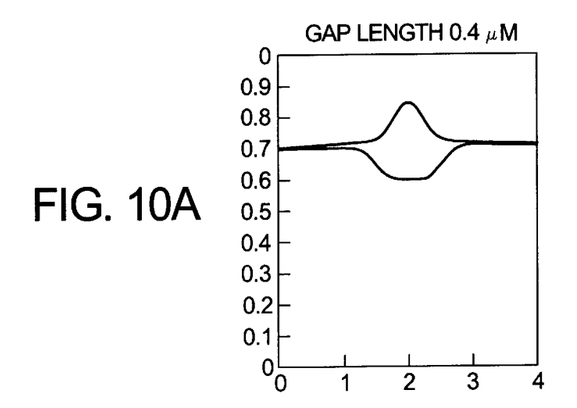
Figure 10B:
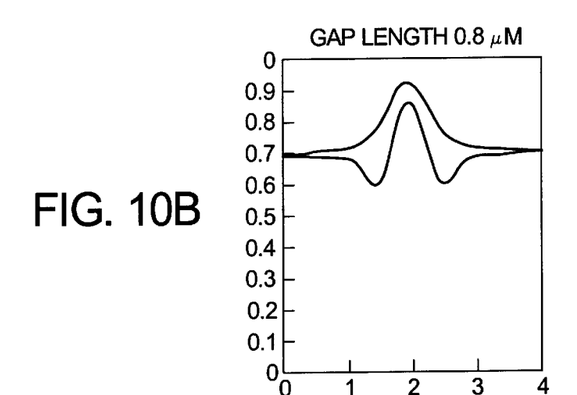
Figure 10C:
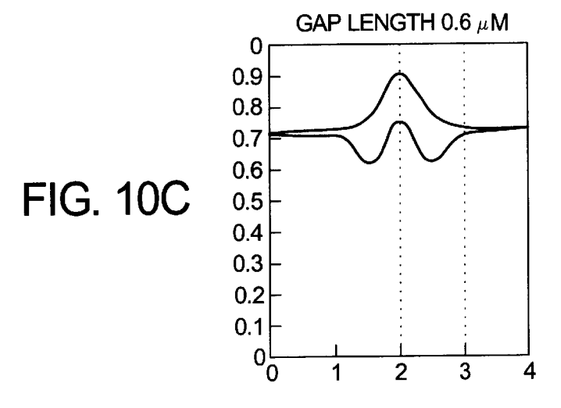
Figure 10D:
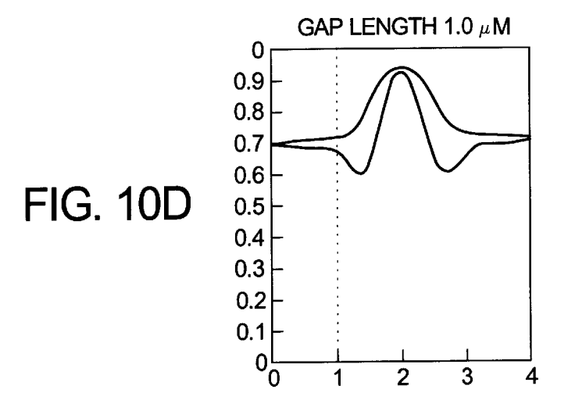

Here, as a groove configuration example, as shown in FIG. 9, it is considered that only the simplest groove G is disconnected.

In an optical recording medium having such a configuration, as shown in FIGS. 10(A,B,C,D), an output is changed depending the disconnection width (gap length) of the groove G. In this embodiment, an effective signal was detected when the gap length is greater than 0.8 $\mu$m. This almost corresponds to the spot diameter of the reproduction laser beam.

From this, it is clear that even with the simple pattern as shown in FIG. 9, if the gap length is greater than the reproduction laser beam spot diameter, it is possible to detect an error signal from an AND signal. It goes without saying that it is possible to detect with an AND signal in a pattern having a mark on the land.

As is clear from the aforementioned, with the optical recording medium according to the present invention, it is possible to insert a control signal in a small area and detect this control signal which may be a clock signal in a state with little jitter.

Moreover, according to the production method of the present invention, it is possible to produce the aforementioned optical recording medium by using a conventional exposure optical system.

What is claimed is:

1. An optical recording medium having a recessed groove and a non-recessed land so that a signal is recorded in both of said groove and said land, wherein each of said groove and said land has a disconnected portion of a predetermined interval so that a control signal is detected from said disconnected portions, said disconnected portion of said groove being a continuous non-recessed portion, said disconnected portion of said land being a continuous recessed portion.

2. An optical recording medium as claimed in claim 1, wherein said interval is greater than a diameter of a laser spot for recording and reproducing said optical recording medium.

* * * * *